US 8,079,554 B2

(12) United States Patent
Sui et al.

(10) Patent No.: US 8,079,554 B2
(45) Date of Patent: Dec. 20, 2011

(54) SUPPORT APPARATUS AND MONITOR SUPPORT APPARATUS

(75) Inventors: Chien-Hua Sui, Taoyuan (TW); Chun-Jung Tsuo, Lujhu Township, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 534 days.

(21) Appl. No.: 12/252,741

(22) Filed: Oct. 16, 2008

(65) Prior Publication Data

US 2009/0101770 A1    Apr. 23, 2009

(30) Foreign Application Priority Data

Oct. 17, 2007   (TW) ............................... 96138793 A (51) Int. Cl.
*A47G 23/03*    (2006.01)
(52) U.S. Cl. ..................... 248/157; 248/125.1; 248/371; 248/919
(58) Field of Classification Search .................. 248/157, 248/917, 919, 920, 921, 922, 923, 371, 125.1
See application file for complete search history.

(56) References Cited

U.S. PATENT DOCUMENTS

| | | | | |
|---|---|---|---|---|
| 6,712,321 | B1 * | 3/2004 | Su et al. | 248/123.11 |
| 6,905,099 | B2 * | 6/2005 | Sung | 248/146 |
| 6,918,564 | B2 * | 7/2005 | Yen et al. | 248/404 |
| 7,036,787 | B1 * | 5/2006 | Lin | 248/676 |
| 7,490,796 | B2 * | 2/2009 | Kim | 248/157 |
| 7,637,463 | B2 * | 12/2009 | Yen et al. | 248/157 |
| 2006/0219849 | A1 * | 10/2006 | Chiu | 248/125.8 |

* cited by examiner

*Primary Examiner* — Terrell McKinnon
*Assistant Examiner* — Steven Marsh (57) ABSTRACT

The invention provides a support apparatus capable of supporting a monitor. The support apparatus includes a mounting base, a first frame mounted on the mounting base, a lock member, and a second frame. The first frame thereon defines a first direction and a second direction perpendicular to the first direction. The first frame includes a through hole along the second direction, a slide extending along the first direction, and a slot. The lock member includes a columnar member and a release part. The release part is disposed to pass through the through hole, and an end of the columnar member is disposed limitedly and movably in the slot. The second frame is disposed movably on the slide, and includes a hook. When the hook engages to the columnar member, the release part can be driven to disengage the columnar member from the hook.

22 Claims, 6 Drawing Sheets

SUPPORT APPARATUS AND MONITOR SUPPORT APPARATUS

BACKGROUND OF THE INVENTION

1. Field of the Invention

The invention relates to a support apparatus and a monitor support apparatus, and particularly to a support apparatus and a monitor support apparatus having a lock and release device.

2. Description of the Prior Art

A support apparatus can be applied in many different fields. Take a monitor as an example, a complete monitor product usually includes a monitor and a mounting base. And, a traditional mounting base only serves as a base, and the monitor is firmly supported by the base to prevent from tilting and falling. However, with the increasing demands of users, a support height of the monitor needs to be adjustable. For this purpose, the current solution is to adopt two main frames engaged movably to each other, wherein one frame is engaged rotatably or directly on the base, and the other frame supports the monitor. Thus, the purpose of adjusting a support height of the monitor can be achieved by adjusting relative positions of two frames.

However, because these two frames may slide during transportation, a problem followed is the inconvenient transportation for the monitor. In order to solve the problem, the current solution utilizes a tenon to fix the frame or disposes a hook mechanic on the base to hook the frame. As for the method of tenon fixing, a positioning pillar is usually used to simultaneously insert into both positioning holes of the frames; however, it is not easy to aim at the positioning holes at the same time. Additionally, disposing a hook mechanism on the base may limit the position of a user to operate the hook mechanism, and the user may need to bow or crouch for operating. Yet, in many situations, such a move is not always easy and workable. For example, the user may be unable to bow or crouch because of the limitation of an operation space or physical problems of the operator himself/herself.

Therefore, the invention provides a support apparatus having a new lock and release device, and provides a more convenient operation for users to solve the aforesaid problems.

SUMMARY OF THE INVENTION

A scope of the invention is to provide a support apparatus and a monitor support apparatus having a lock and release device.

The support apparatus of the invention can support a monitor. The support apparatus includes a mounting base, a first frame mounted on the mounting base, a lock member, and a second frame. The first frame thereon defines a first direction and a second direction perpendicular to the first direction. The first frame includes a through hole along the second direction. The first frame further includes a slide extending along the first direction and a first slot. A cross-section of the slide substantially is formed in the shape of U or V. The lock member includes a columnar member and a release part. Therein, the columnar member is connected to the release part, the release part passes through the through hole, and a first end of the columnar member is disposed limitedly and movably in the first slot. The second frame is disposed movably on the slide. The second frame includes a hook, and the hook is capable of engaging to the columnar member. Therefore, when the hook engages to the columnar member, the release part can be driven to disengage the columnar member from the hook. It should be remarked that the monitor can be fixed on the second frame.

According to the invention, the release part can be spirally connected to the columnar member or fixed on the columnar member by other methods. It is certain that the release part and the columnar part can be monolithic. Additionally, a cross-section of the through hole is not limited to be a circle, and also can be a polygon or other geometric shapes. The cross-section of the release part matches, but is not necessary the same as, the cross-section of the through hole.

Additionally, the support apparatus further includes a first elastic member connected to the columnar member and the first frame. Accordingly, when the hook engages to the columnar member, the first elastic member can assist positioning the columnar member. In the same way, the support apparatus further includes a second elastic member connected to an end portion of the release part and the first frame, therein the second elastic member also can assist in positioning the columnar member. In an embodiment, a cross-section of the end portion of the release part is larger than a cross-section of the through hole. The second elastic member is compressed and disposed between the first frame and the end portion.

According to the invention, the first frame can further include a second slot. A second end of the columnar member is disposed limitedly and movably in the second slot, so the lock member can bear a larger strength without failing. Besides, the slot also can assist in positioning the columnar member. Additionally, the hook is formed in the shape of C, and includes an opening and a block part. The block part includes a protrusion in the opening. When the hook engages to the columnar member, the protrusion can prevent the columnar member from disengaging from the hook because of a little vibration. Additionally, the block part includes an incline, such that the hook can smoothly engage to the columnar member. In the same way, when the columnar member is a cylinder, it can help the hook to engage to the columnar member.

As a whole, the support apparatus of the invention utilizes a hook, and can be disposed on any position of the first frame, so as to effectively solve the problem in prior art.

The advantage and spirit of the invention may be understood by the following recitations together with the appended drawings.

DETAILED DESCRIPTION OF THE INVENTION

Figure 1:
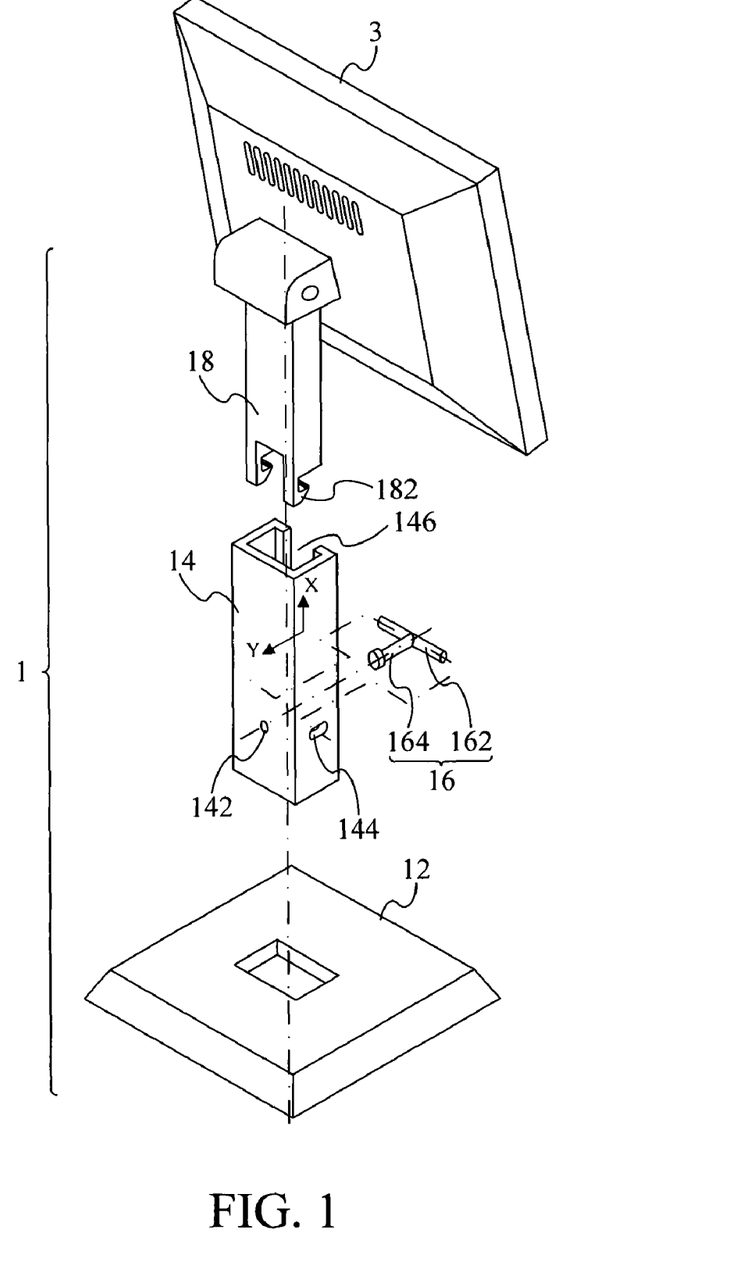
FIG. 1 is an explosion-view of a support apparatus according to a preferred embodiment of the invention.

Please refer to FIG. 1. FIG. 1 is an explosion-view of a support apparatus 1 according to a preferred embodiment of the invention. In the preferred embodiment, the support apparatus 1 of the invention includes a mounting base 12, a first frame 14 mounted on the mounting base 12, a lock member 16, and a second frame 18. The first frame 14 thereon defines a first direction X and a second direction Y perpendicular to the first direction X. The first frame 14 includes a through hole 142 along the second direction Y, and includes two slots 144 along a direction perpendicular to the first direction X and the second direction Y. The two slots 144 relatively are formed on a wall of the first frame 14. The first frame 14 further includes a slide 146 extending along the first direction X. The lock member 16 includes a columnar member 162 and a release part 164, and therein the columnar member 162 is connected to the release part 164. The lock member 16 is movably engaged to the first frame 14 substantially along the second direction Y. Therein, the release part 164 passes through the through hole 142, and two ends of the columnar member 162 is disposed limitedly and movably in the slot 144. A cross-section of the slide 146 substantially is formed in the shape of U. The second frame 18 is disposed movably on the slide 146, such that relative positions of the first frame 14 and the second frame 18 can be adjusted to achieve a purpose of adjusting a support height. The monitor 3 is engaged to the second frame 18.

Figure 2:
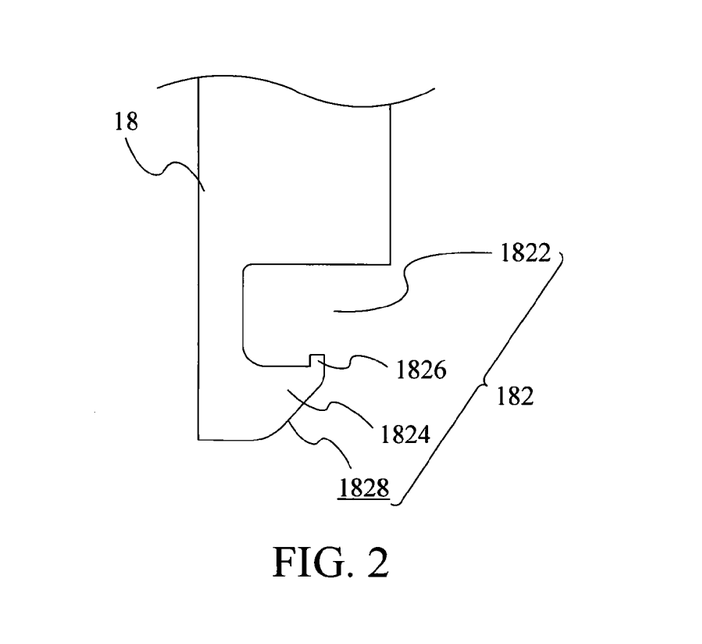
FIG. 2 is a part of a side view of a hook of a second frame.

Additionally, the second frame 18 includes a hook 182 capable of engaging to the columnar member 162. Please refer to FIG. 2. FIG. 2 is a part of a side view of the hook 182 of the second frame 18. As shown in FIG. 2, the hook 182 substantially is formed in the shape of C, and includes an opening 1822 and a block part 1824. The block part 1824 includes a protrusion 1826 in the opening 1822.

Figure 3A:
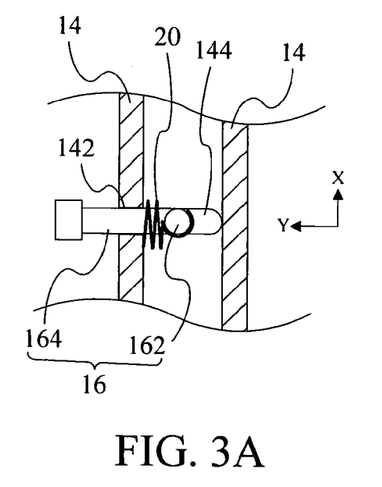
FIG. 3A is a schematic diagram illustrating an engagement between a first frame and a lock member.
Figure 3B:
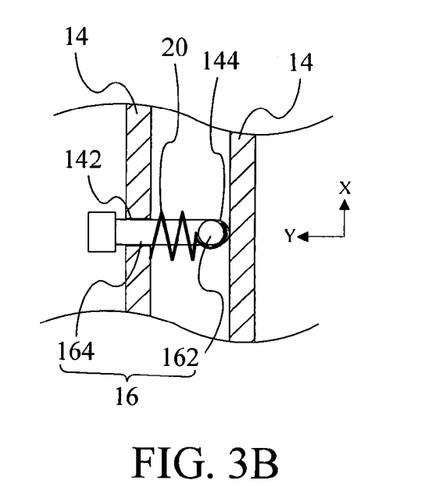
FIG. 3B is a schematic diagram illustrating another engagement between a first frame and a lock member.

Please refer to FIG. 3A and FIG. 3B. FIG. 3A is a schematic diagram illustrating an engagement between the first frame 14 and the lock member 16. FIG. 3B is a schematic diagram illustrating another engagement between the first frame 14 and the lock member 16. It should be noticed that the first frame 14 is illustrated as a part of a cross-section in the FIGS. 3A and 3B. According to the preferred embodiment, the support apparatus 1 further includes two springs 20 symmetrically relative to the release part 164, and the two springs 20 are engaged to the columnar member 162 and an interior wall of the first frame 14. It should be remarked that only one spring 20 can be shown because FIGS. 3A and 3B are side-views.

Figure 4A:
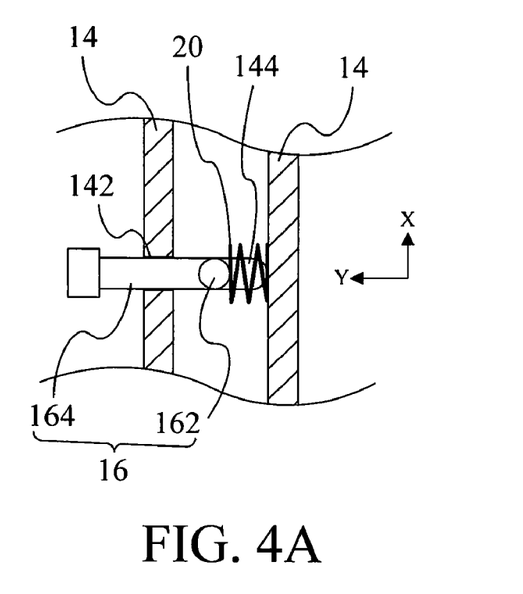
FIG. 4A is a schematic diagram illustrating a disposition of a spring.
Figure 4B:
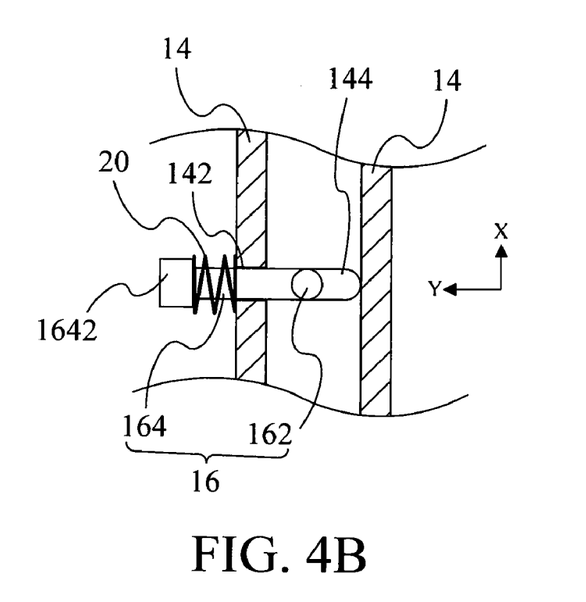
FIG. 4B is a schematic diagram illustrating another disposition of a spring.

When the release part 164 moves along a direction reverse to the second direction Y, the spring 20 will be extended as shown in FIG. 3B. Besides, because two ends of the columnar member 162 are disposed in the slot 144 of the first frame 14, the movement of the release part 164 will be limited. At this time, the spring 20 will generate a restoring force for pulling the release part 164 and the columnar member 162 back to original positions. Because the spring 20 is used for providing a restoring force, the spring 20 is not limited to be disposed in these positions shown in FIGS. 3A and 3B. In practical applications, the spring 20 also can be disposed on another side of the columnar member 162, as shown in FIG. 4A. Also, only one spring 20 can be utilized and disposed out of the first frame 14, as shown in FIG. 4B. In this situation, the spring 20 can cover the release part 164; one end of the spring 20 suppresses the first frame 14, and the other end suppresses the end portion 1642 of the release part 164. And, the cross-section of the end portion 1642 is larger than a cross-section of the through hole 142. Accordingly, the spring 20 is compressed and disposed between the first frame 14 and the end portion 1642. When the release part 164 moves towards a direction reverse to the second direction Y, the spring 20 can also provide a restoring force.

Figure 5A:
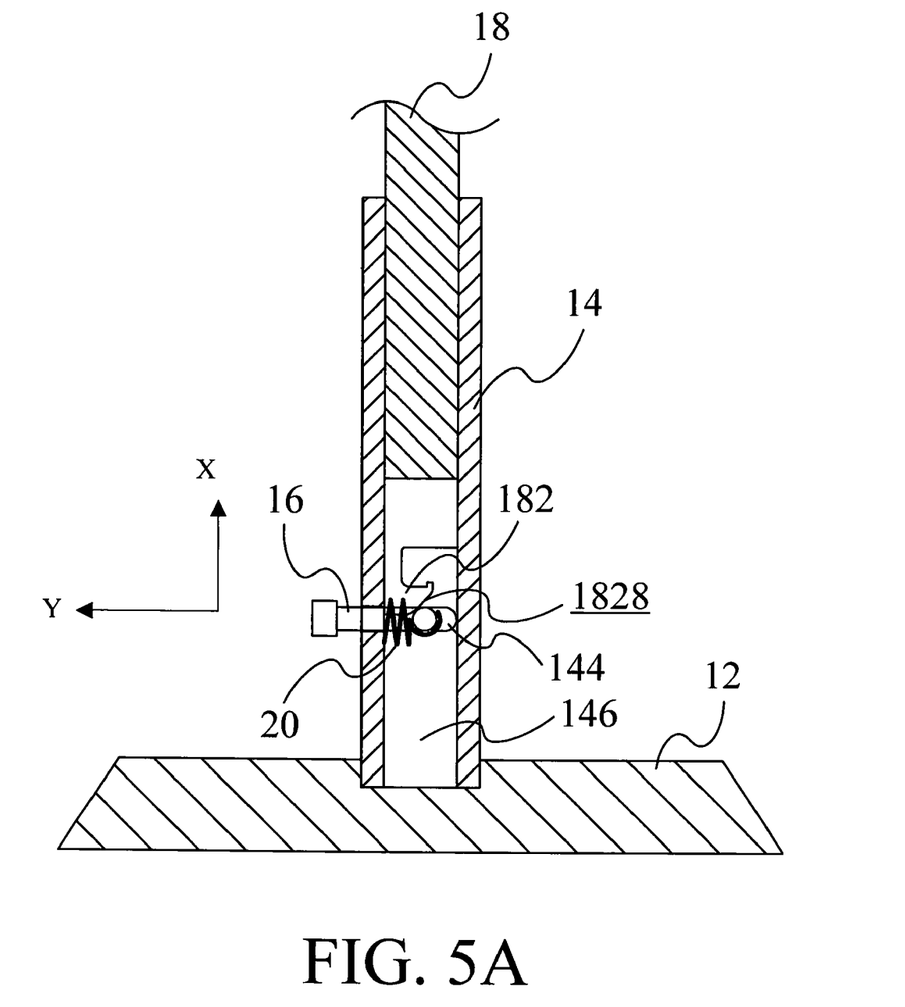
FIG. 5A is a schematic diagram illustrating an engagement between a hook of a second frame and a columnar member.
Figure 5B:
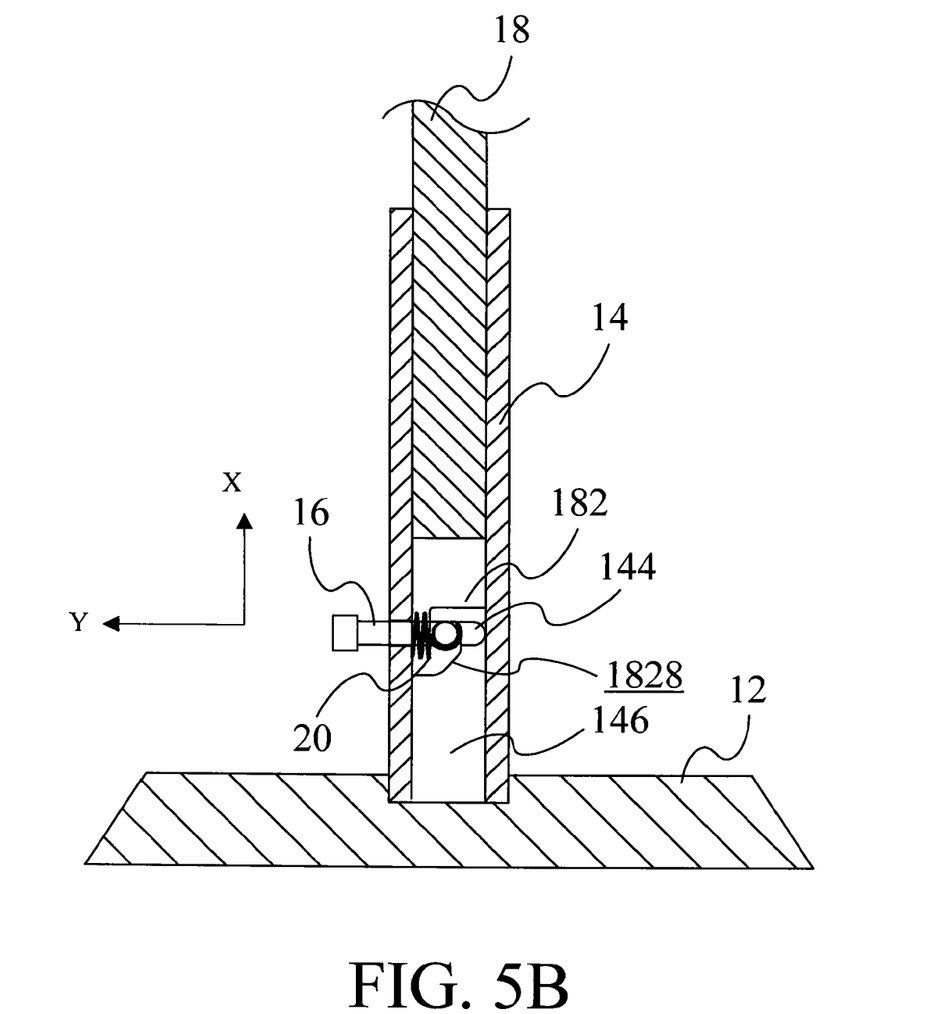
FIG. 5B is a schematic diagram illustrating an engagement between a hook of a second frame and a columnar member.

Please refer to FIGS. 5A and 5B. FIG. 5A is a schematic diagram illustrating an engagement between the hook 182 of the second frame 18 and the columnar member 162. FIG. 5B is a schematic diagram illustrating an engagement between the hook 182 of the second frame 18 and the columnar member 162. As shown in FIGS. 5A and 5B, when the second frame 18 moves downward, the incline 1828 of the block part 1824 of the hook 182 contacts the columnar member 162, and the columnar member 162 moves towards a direction reverse to the second direction Y by the incline 1828. At last, the columnar member 162 engages to the hook 182 in the opening 1822 of the hook 182 because of the restoring force generated by the spring 20.

According to the preferred embodiment, the columnar member 162 is a cylinder, but the invention is not limited to this. Even if the columnar member 162 is formed in other geometric shapes, the columnar member 162 can effectively and smoothly move toward a direction reverse to the second direction Y by the incline 1828 of the hook 182. Additionally, when a vibration occurs, the spring 20 provides a restoring force and the protrusion 1826 of the hook 182 provides the positioning capability, so the columnar member 162 can firmly engage to the hook 182 without loosing.

It should be remarked that two end of the columnar member 162 are disposed in the slot 144 so that the lock member 16 can bear a larger strength. Additionally, a shape of a cross-section of the through hole 142 of the first frame 14 is not limited to circle, and can be other geometric shapes, e.g. a polygon. Thereby, the cross-section of the through hole 142 is designed to be a non-circle, and the cross-section of the release part 164 also is designed to match the cross-section of the through hole 142. The through hole 142 itself has a positioning function (alternatively, the through hole 142 prevents the lock member 16 from rotating relative to the second direction Y), and increases a bearing strength. Additionally, the connection between the columnar member 162 and the release part 164 is a spiral connection or weld. If the lock member 16 is monolithic, the lock member 16 can bear a larger strength.

Figure 6:
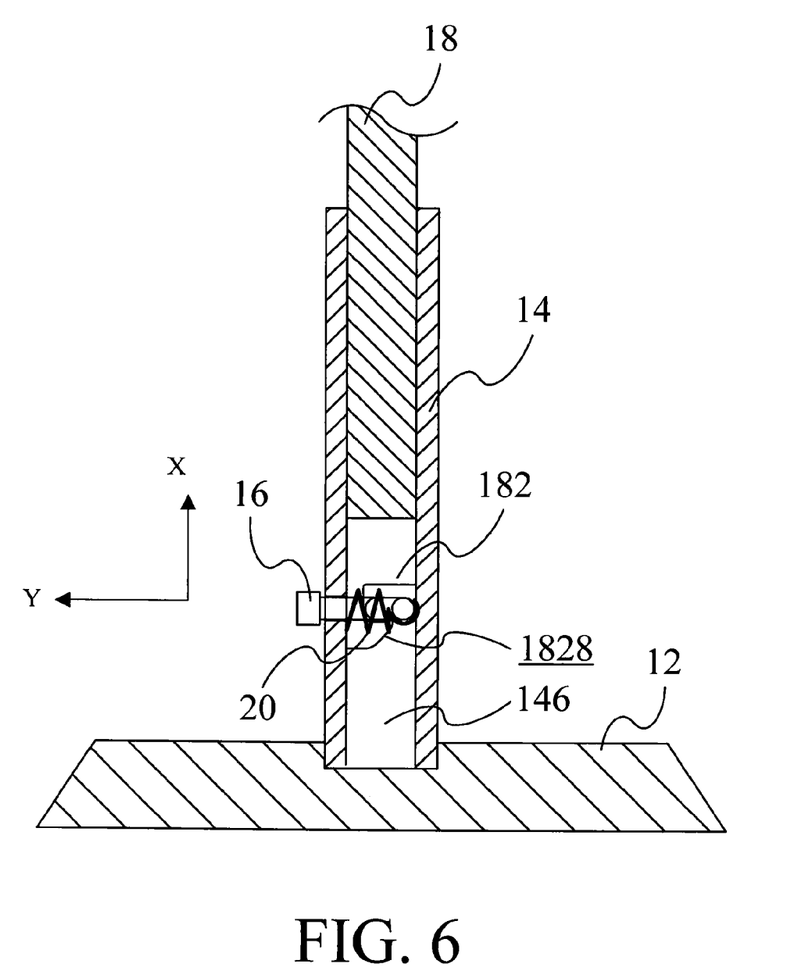
FIG. 6 is a schematic diagram illustrating, when a columnar member engages to a hook, a release part being driven to disengage a columnar member from a hook.

Please refer to FIG. 6. FIG. 6 is a schematic diagram illustrating, when the columnar member 162 engages to the hook 182, the release part 164 being driven to disengage the columnar member 162 from the hook 182. As shown in FIG. 6, when the second frame 18 needs to be heightened, the release part 164 can be pressed for disengaging the columnar member 162 from the hook 182, and then the second frame 18 can move freely. It should be remarked that the release part 164 is driven by pressing according to the preferred embodiment, but the invention is not limited to this. For example, when the opening 1822 of the hook 182 faces toward to the through hole 142 of the first frame 14, and the second frame 18 needs to be released, the release part 164 needs to be pulled for disengaging the columnar member 162 from the hook 182. At the same time, the spring 20 needs to be cooperatively disposed for providing a positioning function, and it is easily achieved by one skilled in this art, so it will not be described here in detail again. Additionally, the hook 182 is not limited to be posited on an end of the second frame 18 as shown in figures. The hook 182 can be posited on other position of the second frame 18 depending on a practical application, but the problems of the actuating and interfering of the whole mechanism should be considered. Since it is understood by one skilled in this art, it will not be described here in detail again.

As a whole, the lock member 16 of the support apparatus 1 of the invention does not need to be fixed on the mounting base 12. Therefore, the first frame 14 can be mounted on the mounting base 12, so as to provide an additional adjusting dimension for the monitor 3, and the practicality of the support apparatus 1 is enhanced. Additionally, the lock member 16 can be configured on any position of the first frame 14, so the user doe not need to bow or crouch for operation. Although a support apparatus in prior art is not usually configured on the ground, the support apparatus 1 of the invention at least provides a choice for users, and the practicality of the support apparatus 1 is then enhanced. It should be remarked that, according to the preferred embodiment, the release part 164 of the lock member 16 is disposed along a direction reverse to that of the monitor 3, but the invention is not limited to this. In other words, the release part 164 can be disposed along a direction the same as that of the monitor 3 depending on a practical product design.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A support apparatus, comprising:
   a mounting base;
   a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;
   a lock member comprising a columnar member and a release part, the columnar member being connected to the release part, the release part movably passing through the through hole, a first end of the columnar member being disposed limitedly and movably in the first slot;
   a second elastic member connected to an end portion of the release part and the first frame; and
   a second frame movably disposed on the slide, the second frame comprising a hook capable of engaging to the columnar member, wherein when the hook engages to the columnar member, the release part can be driven to disengage the columnar member from the hook;
   wherein a cross-section of the end portion of the release part is larger than a cross-section of the through hole, and the second elastic member is compressed and disposed between the first frame and the end portion.

2. The support apparatus of claim 1, further comprising a first elastic member connected to the columnar member and the first frame.

3. The support apparatus of claim 1, wherein a cross-section of the through hole is a polygon, and a cross-section of the release part matches the cross-section of the through hole.

4. The support apparatus of claim 1, wherein the first frame comprises a second slot extending along the second direction, and a second end of the columnar member is limitedly and movably disposed in the second slot.

5. The support apparatus of claim 4, wherein the columnar member is a cylinder.

6. The support apparatus of claim 1, wherein the hook substantially is formed in the shape of C, the hook comprises an opening and a block part, and the block part comprises a protrusion in the opening.

7. The support apparatus of claim 6, wherein the block part comprises an incline.

8. The support apparatus of claim 1, wherein the release part is spirally connected to the columnar member.

9. The support apparatus of claim 1, wherein a cross-section of the slide substantially is formed in the shape of U or V.

10. A monitor support apparatus, comprising:
    a mounting base;
    a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;
    a lock member comprising a columnar member and a release part, the columnar member being connected to the release part, the release part being disposed movably and passing through the through hole, a first end of the columnar member being disposed limitedly and movably in the first slot;
    a second elastic member connected to an end portion of the release part and the first frame;
    a second frame movably disposed on the slide, the second frame comprising a hook capable of engaging to the columnar member, wherein when the hook conjoins with the columnar member, the release part can be driven to disengage the columnar member from the hook; and
    a monitor fixed on the second frame;
    wherein a cross-section of the end portion of the release part is larger than a cross-section of the through hole, and the second elastic member is compressed and disposed between the first frame and the end portion.

11. The monitor support apparatus of claim 10, further comprising a first elastic member connected to the columnar member and the first frame.

12. The monitor support apparatus of claim 10, wherein a cross-section of the through hole is a polygon, and a cross-section of the release part matches the cross-section of the through hole.

13. The monitor support apparatus of claim 10, wherein the first frame comprises a second slot extending along the second direction, and a second end of the columnar member is disposed limitedly and movably in the second slot.

14. The monitor support apparatus of claim 13, wherein the columnar member is a cylinder.

15. The monitor support apparatus of claim 10, wherein the hook substantially is formed in the shape of C, the hook comprises an opening and a block part, and the block part comprises a protrusion in the opening.

16. The monitor support apparatus of claim 15, wherein the block part comprises an incline.

17. The monitor support apparatus of claim 10, wherein the release part is spirally connected to the columnar member.

18. The monitor support apparatus of claim 10, wherein a cross-section of the slide is formed in the shape of U or V.

19. A support apparatus, comprising:
    a mounting base;

a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;

a lock member comprising a columnar member and a release part, the columnar member being connected to the release part, the release part movably passing through the through hole, a first end of the columnar member being disposed limitedly and movably in the first slot; and a second frame movably disposed on the slide, the second frame comprising a hook capable of engaging to the columnar member, wherein when the hook engages to the columnar member, the release part can be driven to disengage the columnar member from the hook;

wherein the first frame comprises a second slot extending along the second direction, and a second end of the columnar member is limitedly and movably disposed in the second slot.

20. A support apparatus, comprising:

a mounting base;

a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;

a lock member comprising a columnar member and a release part, the columnar member being connected to the release part, the release part movably passing through the through hole, a first end of the columnar member being disposed limitedly and movably in the first slot; and a second frame movably disposed on the slide, the second frame comprising a hook capable of engaging to the columnar member, wherein when the hook engages to the columnar member, the release part can be driven to disengage the columnar member from the hook;

wherein the hook substantially is formed in the shape of C, the hook comprises an opening and a block part, and the block part comprises a protrusion in the opening.

21. A monitor support apparatus, comprising:

a mounting base;

a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;

a lock member comprising a columnar member and a release part, the columnar member being connected to the release part, the release part being disposed movably and passing through the through hole, a first end of the columnar member being disposed limitedly and movably in the first slot;

a second frame movably disposed on the slide, the second frame comprising a hook capable of engaging to the columnar member, wherein when the hook conjoins with the columnar member, the release part can be driven to disengage the columnar member from the hook; and a monitor fixed on the second frame;

wherein the first frame comprises a second slot extending along the second direction, and a second end of the columnar member is disposed limitedly and movably in the second slot.

22. A monitor support apparatus, comprising:

a mounting base;

a first frame mounted on the mounting base, the first frame thereon defining a first direction and a second direction perpendicular to the first direction, the first frame comprising a through hole along the second direction, the first frame comprising a slide and a first slot, the slide extending along the first direction, the first slot extending along a third direction;

a lock member comprising a columnar member and a release part, the columnar member being connected to the release part, the release part being disposed movably and passing through the through hole, a first end of the columnar member being disposed limitedly and movably in the first slot;

a second frame movably disposed on the slide, the second frame comprising a hook capable of engaging to the columnar member, wherein when the hook conjoins with the columnar member, the release part can be driven to disengage the columnar member from the hook; and a monitor fixed on the second frame;

wherein the hook substantially is formed in the shape of C, the hook comprises an opening and a block part, and the block part comprises a protrusion in the opening.

* * * * *